United States Patent [19]

Huang et al.

[11] Patent Number: 4,740,702

[45] Date of Patent: Apr. 26, 1988

[54] CRYOGENICALLY COOLED RADIATION DETECTION APPARATUS

[75] Inventors: Yuchi Huang; Jeffrey M. Hoerning, both of Madison, Wis.

[73] Assignee: Nicolet Instrument Corporation, Madison, Wis.

[21] Appl. No.: 821,277

[22] Filed: Jan. 22, 1986

[51] Int. Cl.[4] .................................................. G01J 5/04
[52] U.S. Cl. ................................... 250/352; 62/514 R; 250/338; 250/370
[58] Field of Search ............. 250/352, 370 L, 338 SE; 62/514 R; 357/83

[56] References Cited

U.S. PATENT DOCUMENTS

| | | | |
|---|---|---|---|
| 3,180,989 | 4/1965 | Hand, Jr. et al. | 250/352 |
| 3,596,096 | 7/1971 | Koehler | 250/339 |
| 3,609,992 | 10/1971 | Cacheux | 62/334 |
| 3,889,119 | 6/1975 | Whicker et al. | 250/352 |
| 3,999,403 | 12/1976 | Bower et al. | 62/514 JT |
| 4,155,482 | 5/1979 | Swaney | 220/415 |
| 4,172,225 | 10/1979 | Woldseth et al. | 250/306 |
| 4,184,609 | 1/1980 | Vorreiter | 220/445 |
| 4,194,119 | 3/1980 | MacKenzie | 250/352 |
| 4,206,354 | 6/1980 | Small, Jr. | 250/349 |
| 4,212,169 | 7/1980 | Kneip, Jr. | 62/45 |
| 4,262,200 | 4/1981 | Guy | 250/352 |
| 4,324,104 | 4/1982 | Horn et al. | 62/77 |
| 4,343,413 | 8/1982 | Chatzipetros et al. | 220/425 |
| 4,412,427 | 11/1983 | Horn et al. | 62/298 |
| 4,450,693 | 5/1984 | Green et al. | 62/514 R |
| 4,451,735 | 5/1984 | Diedrich et al. | 250/352 |
| 4,454,481 | 6/1984 | Lewis | 330/307 |
| 4,457,449 | 7/1984 | Bohlander et al. | 220/445 |
| 4,479,367 | 10/1984 | Buller | 62/514 R |
| 4,487,332 | 12/1984 | Huang | 220/445 |
| 4,488,414 | 12/1984 | Jungkman et al. | 62/514 R |
| 4,492,087 | 1/1985 | Schäfer et al. | 62/45 |
| 4,496,073 | 1/1985 | Silver et al. | 220/445 |
| 4,509,342 | 4/1985 | Van Antwerpen | 62/514 R |
| 4,537,328 | 8/1985 | Keesee et al. | 220/445 |
| 4,658,601 | 4/1987 | Burchell et al. | 62/514 R |

FOREIGN PATENT DOCUMENTS 61048  5/1980  Japan ..................................... 357/83

OTHER PUBLICATIONS

J. Chaussy, P. Gianese and J. Peyrard, "Reduction of Evaporation Rate by Use of Metallic Adhesive Tape" Cryogenics vol. 16, No. 10 (Oct. 1976) pp. 617–618.

S. K. Godovikov and V. G. Snigirev, "Magnesium Windows with Miniature Indium Sealing for Helium Cryostats Used in Mössbauer Studies" Cryogenics vol. 16, No. 4 (Apr. 1977) pp. 247–248.

Primary Examiner—Janice A. Howell
Assistant Examiner—Constantine Hannaher
Attorney, Agent, or Firm—Isaksen, Lathrop, Esch, Hart & Clark

[57] ABSTRACT

A radiation detection apparatus, such as for the detection of infrared radiation, is formed of inner and outer cylindrical stainless steel vessels with the inner vessels supported from the top wall of the outer vessel by a thin, relatively long stainless steel tube. A heat transfer mounting member is attached to the bottom of the inner vessel and extends outwardly and then upwardly between and out of contact with the vessels to the position of a window opening within the outer vessel. A detector device is affixed in good thermal contact with the mounting member at the position of the window and thus is maintained substantially at the temperature of the bottom surface of the inner vessel. The surfaces of the inner and outer vessels may be highly polished to prevent heat transfer to the inner vessel by infrared radiation. The use of stainless steel for the outer vessel also allows utilization of a vacuum port window structure having a metal gasket to minimize potential gas infiltration.

19 Claims, 2 Drawing Sheets

CRYOGENICALLY COOLED RADIATION DETECTION APPARATUS

TECHNICAL FIELD

This invention relates generally to cryogenically cooled radiation detectors such as those used in spectroscopic analyses.

BACKGROUND ART

It is common practice to cool certain types of radiation detectors to cryogenic temperatures where high precision is required, particularly the semiconductor detectors of infrared radiation used in infrared spectroscopy. Cooling of the detector to a very low temperature reduces the effects of thermal noise on the detector output signal. To maintain the detector device at both a relatively low and substantially constant temperature, it is thermally isolated from the ambient environment by insulation (usually including a vacuum chamber) and is cooled by a low temperature cooling agent, commonly liquid nitrogen, although other liquified gases (e.g., helium) may be used depending on the temperature at which the detector will be maintained.

The most common type of cryogenically cooled detector structure currently used for infrared spectroscopy includes a Dewar in which the inner and outer vessels forming the Dewar are cylindrical and are constructed of aluminum. The inner vessel is suspended from the top of the outer vessel by a short, thick, fiberglass-epoxy tube which is cemented at its junctions with the inner and outer vessels with epoxy resin. The tube provides thermal isolation between the inner and outer vessels but permits liquid cooling agent to be poured into the inner vessel through a hole in the top of the outer vessel. Since the fiberglass tube also insulates the inner vessel electrically from the outer vessel, an electrical lead wire is attached to the inner vessel and extends through an opening in the outer vessel to a terminal which can be connected to ground to maintain the inner vessel at ground potential. The infrared detector device, e.g., a mercury cadmium telluride (MCT) semiconductor, is mounted to the cylindrical outer surface of the inner vessel so that heat from the detector can be transferred directly to the relatively cool wall of the inner vessel. Radiation is admitted to the detector through a window mounted in the cylindrical side wall of the outer vessel. Typically, this window is held in place by a custom formed copper fitting and an elastomer O-ring engaged to the fitting to seal the space between the inner and outer vessels from the ambient atmosphere.

To further reduce transfer of heat to the inner vessel and the detector, the inner vessel is usually wrapped by many layers of aluminized polyester such as Mylar TM film, commonly known as "superinsulation". After the placement of the super insulating polyester such as Mylar TM film, about the inner vessel, the inner vessel is mounted within the outer vessel, the region between the vessels is evacuated to a low pressure and then sealed to maintain the vacuum. Typically, small charcoal pellets (called "getters") are embedded in epoxy resin on the top of the inner vessel and function to absorb gases which would otherwise accumulate within the vacuum region.

In addition to any gases that may enter the vacuum region by diffusion or leakage from the outside atmosphere, it has been found that materials within the vacuum region will expel gases by a process known as "outgassing". In particular, the low temperature epoxy which is used to cement the fiberglass tube in place is a significant source of these gases. This low temperature epoxy has a relatively high outgassing rate, but even the metal surfaces within the vacuum chamber exhibit outgassing although at a substantially lower rate. In addition, while the layers of mylar superinsulation serve to reduce heat transfer by minimizing the infrared radiation reaching the inner vessel, they interfere with the rapid establishment of a satisfactory low pressure within the vacuum chamber since the layers of mylar tend to trap gas molecules which gradually escape by diffusing between or through the film layers.

SUMMARY OF THE INVENTION

In accordance with the present invention, a radiation detection apparatus suited for operation at cryogenic temperatures is formed of inner and outer metal vessels with the inner vessel suspended from the top of the outer vessel by a metal tube which is affixed to and in electrical contact with both vessels. The inner and outer vessels and the suspending tube are most advantageously formed of stainless steel. It has been found that even though the stainless steel suspending tube is in thermal contact with the inner and outer vessels, the rate of heat transfer through a thin, yet strong stainless steel suspending tube yields an acceptable rate of heat transfer and does not substantially increase the thermal load on the coolant as compared to the conventional thick fiberglass suspending tube. However, because the suspending tube may be welded to the inner and outer vessels, no epoxy or similar gas evolving material need be used to secure the tube to the vessels, thereby eliminating a source of contaminating gas in the vacuum space between the inner and outer vessels. The electrical continuity between the inner and outer vessels further eliminate the need for a separate grounding lead extending through the outer vessel wall to the inner vessel.

A particular advantage of stainless steel for formation of the vessels is that the outer surface of the inner vessel and both surfaces of the outer vessel can be highly polished to reduce the emissivity of these surfaces. These highly polished surfaces act as reflectors of infrared radiation, thereby minimizing the radiative transfer of heat to the inner vessel substantially as effectively as the multiple layers of Polyester film, such as Mylar TM conventionally used. If the mylar superinsulation is not used, a substantial source of gas in the vacuum space is eliminated and the cost and complexity of manufacture is reduced.

In the detector of the present invention, a window structure is utilized which includes stainless steel fittings which tightly engage a copper sealing ring. Because the window fittings and outer vessel are each formed of stainless steel, less disparity in the expansion rates of the various parts is encountered, and a copper seal may be used rather than a less gas impermeable elastomer O-ring.

The detection apparatus of the present invention is further characterized in that the detector device itself, e.g., a semiconductor detector such as mercury cadmium telluride, is mounted to a heat conducting mounting member which extends from thermal contact with the bottom surface of the inner vessel and extends outwardly and upwardly in spaced relation to both vessels to the position at which the detector device is to be located. The conductive mounting member is made of a material, such as copper, which has a high thermal conductivity so that the detector device is maintained substantially at the same temperature as the bottom of the inner vessel. Thus, when the inner vessel is filled with a cryogenic coolant, the bottom of the vessel will remain at the coolant temperature, as will the detector device in thermal communication therewith, even if the level of coolant in the inner vessel drops below the vertical position of the detector device.

Further objects, features, and advantages will be apparent from the following detailed description when taken in conjunction with the accompanying drawings showing a cryogenically cooled radiation detection apparatus in accordance with the invention.

DETAILED DESCRIPTION OF THE INVENTION

Figure 1:
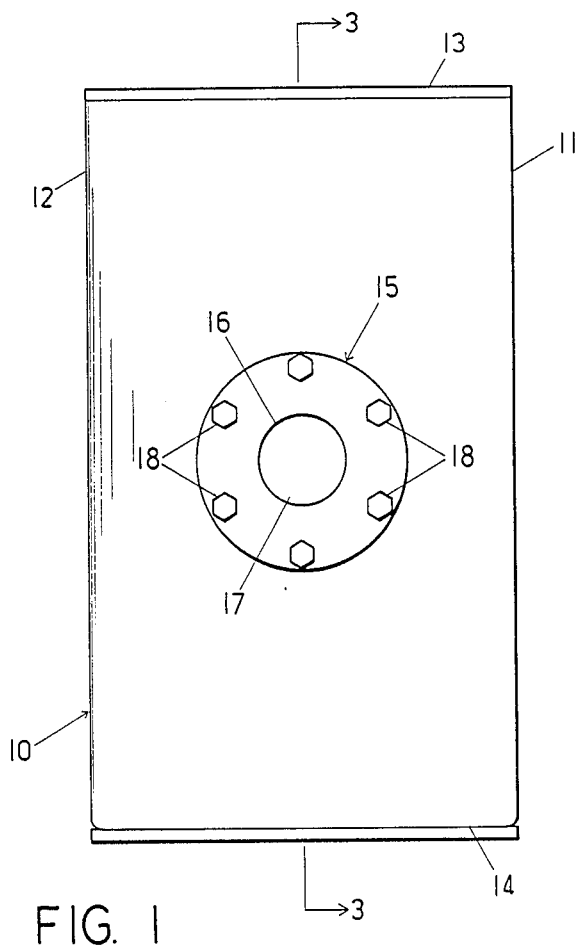
FIG. 1 is a front elevation view of the radiation detection apparatus of the invention.

With reference to the drawings, a cryogenically cooled radiation detection apparatus in accordance with the present invention is shown generally at 10 in FIG. 1. The detection apparatus 10 has an outer vessel 11 with a generally cylindrical outer side wall 12 and a flat top wall 13 and bottom wall 14. A window structure 15 is formed on the cylindrical side wall 12 and includes a central opening 16 surrounding a window 17 which is transparent to the particular radiation being measured (e.g., infrared electromagnetic radiation). A series of bolts 18 are provided for the assembly of the window structure, as described further below. For measurement of infrared radiation, a window structure is required since infrared cannot penetrate solid metal. Although the external shape of the detection apparatus 10 is shown as cylindrical, it is apparent that the external shape can be selected as desired provided that sufficient structural integrity is obtained to allow "vacuum" type pressures to be imposed within the walls of the outer vessel 11.

Figure 3:
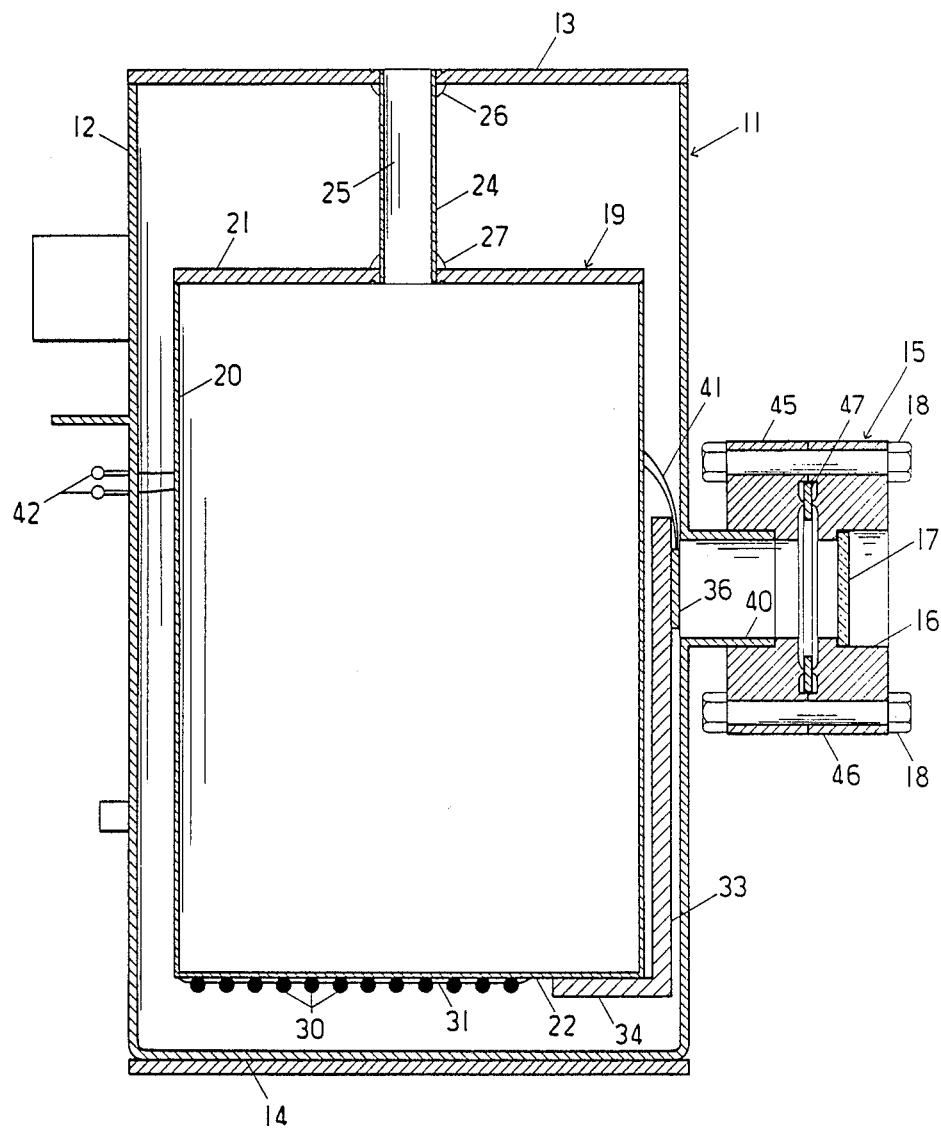
FIG. 3 is a cross-sectional view of the detection apparatus of FIG. 1 taken generally along the lines 3—3 of FIG. 1.

As illustrated in the cross-section of FIG. 3, a cylindrical inner vessel 19 is disposed within the internal cavity of the outer vessel 11 and includes a cylindrical side wall 20, a flat top wall 21 and a flat bottom wall 22 which surround an interior cavity for holding cryogenic coolant. A suspending tube 24 having a hollow interior bore 25 extends from attachment to the outer vessel top wall 12 to attachment to the top wall 21 of the inner vessel. The bore 25 of the tube 24 provides access from outside the detection apparatus to the interior cavity of the inner vessel 19 to allow coolant to be poured therein. The walls of the outer vessel 11, the walls of the inner vessel 19 and the tube 24 are preferably all formed of stainless steel (e.g., 300 series), with the tube 24 being secured by welds 26 and 27 to the outer and inner vessels, respectively. Exemplary wall thickness ranges found satisfactory for the outer and inner vessel are, respectively, 0.035–0.060 inch (0.089–0.152 cm) and 0.020–0.040 inch (0.051–0.102 cm). The welds 26 and 27 additionally serve as seals to prevent the transmission of gases through the junction between the tube and the vessels and establish electrical continuity between the inner and outer vessels, thereby eliminating the need for a ground lead attached to the inner vessel. The tube 24 is relatively long, narrow and thin, having a fairly low thermal conduction rate, but being in electrical contact with both the inner vessel 19 and the outer vessel 11. Satisfactory performance may be obtained with a tube formed of 300 series stainless steel having a wall thickness range of 0.004–0.020 inch (0.010–0.050 cm), a length range of 0.75–1.5 inches or more (1.91–3.81 cm), and an outer diameter range of 0.25–0.50 inch (0.64–1.27 cm). Preferably, the length to area ratio of the tube will be at least 20. The inner vessel 19 is suspended by the tube with its walls spaced away from the inner surfaces of the walls of the outer vessel to define a vacuum chamber space therebetween which can be evacuated to a very low pressure to provide a thermal barrier between the inner and outer vessels.

To minimize radiative transfer of heat to the inner vessel, the inner and outer surfaces of the outer vessel 11 and the outer surfaces of the inner vessel 19 are highly polished, preferably such that the emissivity of the surfaces is 0.1 or less. The surfaces of the stainless steel vessels will readily accept polishing to achieve a low emissivity because of the surface hardness of stainless steel and will maintain such a finish without substantial degradation from oxidation. In particular, the inner surface of the outer vessel 11 and the outer surface of the inner vessel 19 will retain their polished finish indefinitely since the vacuum space which they surround has a relatively low oxygen content, thereby ensuring that oxidation of the inner surfaces proceeds very slowly. It has been found that such polishing of the surfaces of the stainless steel vessels will be substantially as effective in preventing radiative transfer of heat to the inner vessel as the multiple layers of aluminized mylar which are conventionally used in detectors of this type when a very low pressure is maintained between the vessels.

The vacuum pressure in the chamber between the inner and outer vessels is produced during the manufacturing process. To further maintain the integrity of the low pressure within the vacuum chamber, charcoal getter pellets 30 are preferably affixed to the bottom surface 22 of the inner vessel, such as by adherence using a low temperature epoxy 31. It is preferred that the getters 30 be affixed to the bottom surface of the inner vessel rather than the top surface—the conventional practice—since the bottom surface placement has been found to be more effective in maintaining the low gas pressure within the vacuum chamber.

A mounting member 33, formed of a good thermal conductor such as copper, is affixed at a foot portion 34 to the outer bottom surface of the inner vessel 19 and extends outwardly into the space between the walls of the inner and outer vessels and upwardly to a position at which the detector device 36 may be mounted. The device 36 is attached in good thermal contact with the mounting member 33 so that heat will be conducted away from the detector device 36 through the member 33 to the bottom surface of the inner vessel 19. Where the mounting member 33 is formed of copper, the bottom foot 34 may be brazed to the bottom surface of the stainless steel inner vessel, providing good thermal contact between the two. The inner vessel will be periodically filled through the tube 24 with a cryogenic coolant, such as liquid nitrogen, but as the liquid nitrogen warms and boils off (with the gaseous nitrogen being discharged through the bore of the tube 25 to ambient atmosphere), the level of the liquid nitrogen in the inner vessel will drop. The coolant level may well drop below the vertical position of the detector device 36. If the detector device 36 were directly adhered to the outer surface of the inner vessel 19, as is conventional, and the coolant level dropped below the position of the detector device, heat would have to be transferred from the detector device through the wall 20 of the inner vessel to the liquid nitrogen within the vessel. The stainless steel of which the inner vessel is preferably formed is not an ideal heat conductor, particularly at the relatively thin wall thicknesses which are preferably used in accordance with the present invention, thus presenting the possibility of a substantial temperature differential between the detector 36 and the cryogenic coolant. However, as long as coolant remains in the inner vessel, the bottom wall 22 of the inner vessel will be substantially at the temperature of the cryogenic coolant, and the mounting member 33, which has a high heat conductivity, will conduct away heat from the detector device 36 to the bottom wall 22 to maintain the detector device substantially at the coolant temperature no matter what the level of the coolant.

The detector device 36 is responsive to radiation received through an opening defined by a tubular ring member 40 which is affixed to and extends outwardly from the cylindrical side wall 12 of the outer vessel. The ring 40 may be formed integrally with the side wall 12 or may be welded thereto, but in either case is preferably also formed of stainless steel. For detection of infrared radiation, various semiconductor devices may be used for the detector 36, with mercury cadmium telluride (MCT) devices being preferred. The signal from the device 36 may be transmitted out from the detector 10 in any appropriate fashion, for example by wires 41 which extend to terminals 42 mounted on the outside of the outer vessel which may be electrically connected to appropriate signal processing equipment.

Figure 2:
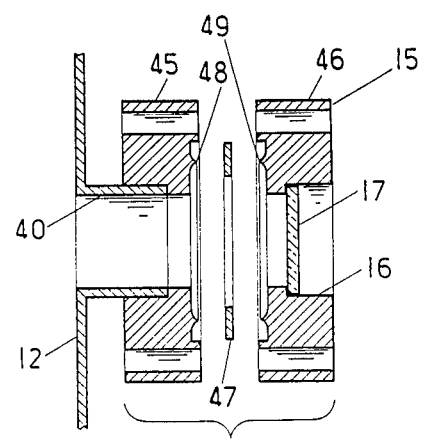
FIG. 2 is a cross-sectional view through a portion of the radiation detection apparatus of FIG. 1 showing the window structure in disassembled relation.

The window structure 15 is preferably formed as a standard stainless steel vacuum port of the type known as a "conflat" port. The structure 15 includes a first stainless steel fitting 45 having a central internal bore which fits partially over the outer surface of the tubular ring 40 and is welded thereto. A second stainless steel fitting 46 has a circular bore with a ledge onto which is mounted the window 17 (for example, formed of zinc selenide for transmission of infrared) which may be cemented in place using a room temperature epoxy with a relatively low outgassing rate. A circular copper gasket 47 is mounted between the fittings 45 and 46 to seal the interior of the outer vessel 11 from external atmosphere. The fittings 45 and 46 are preferably both formed of stainless steel, compatible in metallury and thermal expansion rate to the metal of the ring 40. As best illustrated in FIG. 2, the fittings 45 and 46 preferably have sharp edged, raised circular ridges 48 and 49, respectively, formed on their facing surfaces which are adapted to engage with the relatively softer copper gasket 47. As the bolts 18 are tightened to draw the two fittings 45 and 46 together, the raised ridges 48 and 49 penetrate into the copper gasket 47 to form a very tight seal which is less subject to leakage than the elastomer O-ring seal customarily used in conventional detectors.

The above-described structure for the radiation detection apparatus 10 allows simpler initial manufacture than conventional structures. The present apparatus is also found to maintain the detector device at a more stable temperature over time. A more permanent vacuum is maintained within the vacuum chamber between the outer vessel 11 and inner vessel 19 because there is less gas permeation through the joints and little or no epoxy resin inside the vacuum chamber. Consequently too, the vacuum chamber may be drawn to a low pressure faster. In addition to the foregoing advantages, it has been found that the apparatus 10 avoids a problem which is found commonly in standard Dewar-type radiation detectors: the formation of ice crystals on the inner surfaces of the vacuum chamber. The cause or causes of ice crystal formation in standard devices is unclear, but such ice crystals are a significant problem because they can form on or adjacent to the surface of the detector device and produce contamination in the resulting spectrogram. Substantially no ice crystal formation has been observed utilizing the apparatus in accordance with the present invention.

It is understood that the invention is not confined to the particular embodiment described and illustrated herein, but embraces such modified forms thereof as come within the scope of the following claims.

What is claimed is:

1. Radiation detection apparatus coolable to cryogenic temperatures comprising:
    (a) an outer vessel having walls defining an interior cavity therein;
    (b) an inner vessel disposed within the interior cavity of the outer vessel and itself having walls defining an interior cavity for holding cryogenic coolant;
    (c) means for supporting the inner vessel within the interior cavity of the outer vessel with the walls of the inner vessel spaced away from the surfaces of the outer vessel and for providing communication between the ambient atmosphere and the interior cavity of the inner vessel;
    (d) window means for providing transmission of radiation to be detected through a window to an opening in the outer wall of the outer vessel while sealing off the vacuum chamber defined between the inner and outer vessels from the ambient atomosphere;
    (e) a mounting member formed of a highly heat conductive metal mounted to the bottom surface of the inner cavity in heat transfer contact and extending outwardly and thence upwardly from the point of mounting in the vacuum chamber in spaced relation to the walls of the inner and outer vessels to a position at the opening in the outer vessel at which the window structure means is mounted;
    (f) radiation detector means for detecting incident radiation and providing an output signal indicative thereof, mounted in heat transfer contact to the mounting member at a position adjacent to the window means to receive radiation transmitted therethrough, such that the detector means will be maintained by heat transfer through the mounting member at a temperature substantially at the temperature of the bottom surface of the inner vessel to which the mounting member is attached, which will itself be maintained substanatially at the temperature of cryogenic coolant remaining within the interior cavity of the inner vessel.

2. The detection apparatus of claim 1 wherein the inner and outer vessels are formed of stainless steel and the means for supporting the inner vessel includes a hollow tube of stainless steel attached to a wall of the outer vessel and extending to and attached to a wall of the inner vessel, the interior bore of the tube providing communication between the ambient atmosphere and the interior cavity of the inner vessel, the hollow tube supporting the inner vessel within the outer vessel with the walls of the inner vessel spaced away from the surfaces of the outer vessel to define a vacuum chamber between the inner and outer vessels.

3. The detection apparatus of claim 2 wherein the window means includes first and second stainless steel fittings, the first fitting fixedly mounted to a tubular ring extending from the outer vessel and wherein the fittings have sharp raised ridges encircling a central bore for each fitting, and including a copper gasket adapted to be engaged between the raised ridges on the first and second fittings as the fittings are drawn together, and bolts engaged to the fittings to hold the fittings tightly together, and a window transparent to radiation to be detected mounted to the second fitting to close the bore thereof to seal the vacuum chamber within the inner and outer vessels from the ambient atmosphere.

4. The detection apparatus of claim 3 wherein the inner and outer vessels are both cylindrical in shape, each having a cylindrical outer wall and flat top and bottom walls, and wherein the suspending tube extends from attachment to the top wall of the outer vessel to attachment to the top wall of the inner vessel.

5. The detection apparatus of claim 4 including getters for residual gas affixed to the outer surface of the bottom wall of the inner vessel.

6. The detection apparatus of claim 3 wherein the outer surface of the inner vessel and the inner and outer surfaces of the outer vessel are highly polished to substantially reflect infrared radiation incident thereon.

7. The detection apparatus of claim 1 wherein the detector device comprises a semiconductor responsive to infrared radiation.

8. The detection apparatus of claim 1 wherein the mounting member is formed of copper and is mounted to the bottom of the stainless steel inner vessel by brazing.

9. Radiation detection apparatus coolable to cryogenic temperatures comprising:
  (a) an outer vessel having walls formed of stainless steel defining an interior cavity;
  (b) an inner vessel having walls formed of stainless steel defining an interior cavity for holding cryogenic coolant, the inner vessel disposed within the interior cavity of the outer vessel;
  (c) a hollow suspending tube of stainless steel attached to a wall of the outer vessel and extending to and attached to a wall of the inner vessel to provide electrical continuity therebetween, the interior bore of the tube providing communication between the ambient atmosphere and the interior cavity of the inner vessel, the hollow tube supporting the inner vessel within the outer vessel with the walls of the inner vessel spaced away from the surfaces of the outer vessel to define a vacuum chamber between the inner and outer vessels;
  (d) window means mounted to the outer vessel and having a window formed therein for allowing admission of the radiation to be detected and sealing off the vacuum chamber between the inner and outer vessels from the ambient atmosphere;
  (e) a radiation detector device responsive to the radiation to be detected to provide an output signal indicative thereof; and
  (f) a mounting member of thermally conductive material attached to the outer surface of the bottom wall of the inner vessel in good heat transfer contact and extending outwardly and upwardly in the vacuum chamber in a position spaced away from the surfaces of the inner and outer vessels to the position of the window means in the outer vessel and having the detector device mounted thereto in good heat transfer contact at a position to receive radiation to be detected passing through the window means.

10. The detection apparatus of claim 9 wherein the window means includes first and second stainless steel fittings, the first fitting fixedly mounted to a tubular ring extending from the outer vessel and wherein the fittings have sharp raised ridges encircling a central bore for each fitting, and including a copper gasket adapted to be engaged between the raised ridges on the first and second fittings as the fittings are drawn together, and bolts engaged to the fittings to hold the fittings tightly together, and a window transparent to radiation to be detected mounted to the second fitting to close the bore thereof to seal the vacuum chamber within the inner and outer vessels from the ambient atmosphere.

11. The detection apparatus of claim 9 wherein the detector device comprises a semiconductor responsive to infrared radiation.

12. The detection apparatus of claim 9 wherein the inner and outer vessels are both cylindrical in shape, each having a cylindrical outer wall and flat top and bottom walls, and wherein the suspending tube extends from attachment to the top wall of the outer vessel to attachment to the top wall of the inner vessel.

13. The detection apparatus of claim 12 wherein the outer surface of the inner vessel and the inner and outer surfaces of the outer vessel are highly polished to substantially reflect infrared radiation incident thereon.

14. The detection apparatus of claim 13 including getters for residual gas affixed to the outer surface of the bottom wall of the inner vessel.

15. The detection apparatus of claim 9 wherein the mounting member is formed of copper and is mounted to the bottom of the stainless steel inner vessel by brazing.

16. Radiation detection apparatus coolable to cryogenic temperatures comprising:
  (a) an outer vessel having walls formed of stainless steel defining an interior cavity;
  (b) an inner vessel having walls formed of stainless steel defining an interior cavity for holding cryogenic coolant, the inner vessel disposed within the interior cavity of the outer vessel;
  (c) a hollow suspending tube of stainless steel attached to a wall of the outer vessel and extending to and attached to a wall of the inner vessel to provide electrical continuity therebetween, the interior bore of the tube providing communication between the ambient atmosphere and the interior cavity of the inner vessel, the hollow tube supporting the inner vessel within the outer vessel with the walls of the inner vessel spaced away from the surfaces of the outer vessel to define a vacuum chamber between the inner and outer vessels;

(d) window means mounted to the outer vessel and having a window formed therein for allowing admission of the radiation to be detected and sealing off the vacuum chamber between the inner and outer vessels from the ambient atmosphere, wherein the window means includes first and second stainless steel fittings, the first fitting fixedly mounted to a tubular ring extending from the outer vessel and wherein the fittings have sharp raised ridges encircling a central bore for each fitting, and including a copper gasket adapted to be engaged between the raised ridges on the first and second fittings as the fittings are drawn together, and bolts engaged to the fittings to hold the fittings tightly together, and a window transparent to radiation to be detected mounted to the second fitting to close the bore thereof to seal the vacuum chamber within the inner and outer vessels from the ambient atmosphere;

(e) a radiation detector device responsive to the radiation to be detected to provide thermal conduction from the detector device to the wall of the inner vessel to allow effective heat transfer from the detector device to the inner vessel; and (f) means mounting the detector device to the inner vessel to provide thermal conduction from the detector device to the wall of the inner vessel to allow effective heat transfer from the detector device to the inner vessel.

17. Radiation detection apparatus coolable to cryogenic temperatures comprising:

(a) an outer vessel having walls formed of stainless steel defining an interior cavity;

(b) an inner vessel having walls formed of stainless steel defining an interior cavity for holding cryogenic coolant, the inner vessel disposed within the interior cavity of the outer vessel;

(c) a hollow suspending tube of stainless steel attached to a wall of the outer vessel and extending to and attached to a wall of the inner vessel to provide electrical continuity therebetween, the interior bore of the tube providing communication between the ambient atmosphere and the interior cavity of the inner vessel, the hollow tube supporting the inner vessel within the outer vessel with the walls of the inner vessel spaced away from the surfaces of the outer vessel to define a vacuum chamber between the inner and outer vessels, wherein the inner and outer vessels are both cylindrical in shape, each having a cylindrical outer wall and flat top and bottom walls, and wherein the suspending the tube extends from attachment to the top wall of the outer vessel to attachment to the top wall of the inner vessel;

(d) window means mounted to the outer vessel and having a window formed therein for allowing admission of the radiation to be detected and sealing off the vacuum chamber between the inner and outer vessels from the ambient atmosphere;

(e) a radiation detector device responsive to the radiation to be detected to provide an output signal indicative thereof;

(f) means for mounting the detector device to the inner vessel to provide thermal conduction from the detector device to the wall of the inner vessel to allow effective heat transfer from the detector device to the inner vessel; and (g) getters for residual gas affixed to the outer surface of the bottom wall of the inner vessel.

18. Radiation detection apparatus coolable to cryogenic temperatures comprising:

(a) an outer vessel having walls formed of stainless steel defining an interior cavity;

(b) an inner vessel having walls formed of stainless steel defining an interior cavity for holding cryogenic coolant, the inner vessel disposed within the interior cavity of the outer vessel;

(c) a hollow suspending tube of stainless steel attached to a wall of the outer vessel and extending to and attached to a wall of the inner vessel to provide electrical continuity therebetween, the interior bore of the tube providing communication between the ambient atmosphere and the interior cavity of the inner vessel, the hollow tube supporting the inner vessel within the outer vessel with the walls of the inner vessel spaced away from the surfaces of the outer vessel to define a vacuum chamber between the inner and outer vessels, wherein the inner and outer vessels are both cylindrical in shape, each having a cylindrical outer wall and flat top and bottom walls, and wherein the suspending tube extends from attachment to the top wall of the outer vessel to attachment to the top wall of the inner vessel;

(d) window means mounted to the outer vessel and having a window formed therein for allowing admission of the radiation to be detected and sealing off the vacuum chamber between the inner and outer vessels from the ambient atmosphere;

(e) a radiation detector device responsive to the radiation to be detected to provide an output signal indicative thereof; and (f) means for mounting the detector device to the inner vessel to provide thermal conduction from the detector device to the wall of the inner vessel to allow effective heat transfer from the detector device to the inner vessel, wherein the means for mounting the detector device to the inner vessel includes a mounting member of thermally conductive material attached to the outer surface of the bottom wall of the inner vessel in good heat transfer contact and extending outwardly and upwardly in the vacuum chamber in a position spaced away from the surfaces of the inner and outer vessels to the position of the window means in the outer vessel and having the detector device mounted thereto in good heat transfer contact at a position to receive radiation to be detected passing through the window means.

19. The detection apparatus of claim 18 wherein the mounting member is formed of copper and is mounted to the bottom of the stainless steel inner vessel by brazing.

* * * * *

UNITED STATES PATENT AND TRADEMARK OFFICE
CERTIFICATE OF CORRECTION

PATENT NO. : 4,740,702

DATED : April 26, 1988     Page 1 of 2

INVENTOR(S) : Huang, et al.

It is certified that error appears in the above-identified patent and that said Letters Patent is hereby corrected as shown below:

Claim 16 should be rewritten as follows:

16. Radiation detection apparatus coolable to cryogenic temperatures comprising:

(a) an outer vessel having walls formed of stainless steel defining an interior cavity;

(b) an inner vessel having walls formed of stainless steel defining an interior cavity for holding cryogenic coolant, the inner vessel disposed within the interior cavity of the outer vessel;

(c) a hollow suspending tube of stainless steel attached to a wall of the outer vessel and extending to and attached to a wall of the inner vessel to provide electrical continuity therebetween, the interior bore of the tube providing communication between the ambient atmosphere and the interior cavity of the inner vessel, the hollow tube supporting the inner vessel within the outer vessel with the walls of the inner vessel spaced away from the surfaces of the outer vessel to define a vacuum chamber between the inner and outer vessels;

(d) window means mounted to the outer vessel and having a window formed therein for allowing admission of the radiation to be detected and sealing off the vacuum chamber between the inner and outer vessels from the ambient atmosphere, wherein the window means includes first and second stainless steel fittings, the first fitting fixedly mounted to a tubular ring extending from the outer vessel and wherein the fittings have sharp raised ridges encircling a central bore for each fitting, and including a copper gasket adapted to be engaged between the raised ridges on the first and second fittings as the fittings are drawn together, and bolts engaged to the fittings to hold the fittings tightly together, and a window transparent to radiation to be detected mounted to the second fitting to close the bore thereof to seal the vacuum chamber within the inner and outer vessels from the ambient atmosphere;

UNITED STATES PATENT AND TRADEMARK OFFICE
CERTIFICATE OF CORRECTION

PATENT NO. : 4,740,702

DATED : April 26, 1988

INVENTOR(S) : Huang, et al.

It is certified that error appears in the above-identified patent and that said Letters Patent is hereby corrected as shown below:

(e) a radiation detector device responsive to the radiation to be detected to provide [thermal conduction from the detector device to the wall of the inner vessel to allow effective heat transfer from the detector device to the inner vessel] <u>an output signal indicative thereof</u>; and (f) means for mounting the detector device to the inner vessel to provide thermal conduction from the detector device to the wall of the inner vessel to allow effective heat transfer from the detector device to the inner vessel.

Signed and Sealed this

Twenty-seventh Day of December, 1988

*Attest:*

DONALD J. QUIGG

*Attesting Officer*     *Commissioner of Patents and Trademarks*